United States Patent
Steenis et al.

(10) Patent No.: US 6,399,912 B1
(45) Date of Patent: Jun. 4, 2002

(54) METHOD AND APPARATUS FOR SUBMERGED ARC WELDING

(75) Inventors: Robert D. Steenis, Kaukauna; David J. Lease, Appleton, both of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/558,437

(22) Filed: Apr. 25, 2000

(51) Int. Cl.$^7$ ................................................. B23K 9/18
(52) U.S. Cl. ...................................................... 219/73.2
(58) Field of Search ........................ 219/73.2, 73, 73.21

(56) References Cited

U.S. PATENT DOCUMENTS

| | | | |
|---|---|---|---|
| 3,560,698 A | * | 2/1971 | Taylor et al. ........... 219/124.22 |
| 3,582,599 A | * | 6/1971 | Yohn ............................ 219/60 |
| 3,670,139 A | * | 6/1972 | Pandjiris et al. ............. 219/130 |
| 3,858,360 A | * | 1/1975 | Piet ............................... 51/12 |
| 4,221,957 A | | 9/1980 | Barger et al. |
| 4,242,007 A | | 12/1980 | Ogden et al. |
| 4,327,270 A | * | 4/1982 | Lundin ....................... 219/73.2 |
| 4,339,897 A | | 7/1982 | Thompson et al. |
| 4,342,897 A | | 8/1982 | Murai et al. |
| 4,381,898 A | | 5/1983 | Rotolico et al. |
| 4,455,222 A | | 6/1984 | Less |
| 4,524,802 A | * | 6/1985 | Lawrence et al. .......... 137/595 |
| 4,570,047 A | | 2/1986 | Vislosky |
| 4,715,749 A | | 12/1987 | Hoppe et al. |
| 4,901,928 A | | 2/1990 | Abbott et al. |
| 4,994,644 A | | 2/1991 | Varenchuk et al. |
| 5,021,149 A | | 6/1991 | Geisseler |
| 5,024,029 A | | 6/1991 | Abbott et al. |
| 5,323,547 A | | 6/1994 | Kaiju et al. |
| 5,490,809 A | * | 2/1996 | Jones et al. .................... 451/60 |

OTHER PUBLICATIONS

The Lincoln Electric Company, "NA–3 and NA–4 Automatic Welding Systems", Operating Manual, May 1997, pp. P–101–H and P–101–H.1 and page entitled "Sec. L2.7—Optional Features Installation".

The Lincoln Electric Company, "NA–5 Automatic Welding System", Operator's Manual, Sep. 1998, pp. P–101–H and P–101–H.1 and page entitled "Sec. T2.5—Optional Features Installation—Cont'd".

* cited by examiner

Primary Examiner—Tom Dunn
Assistant Examiner—Zidia Pittman
(74) Attorney, Agent, or Firm—Mark W. Croll; John H. Pilarski; Joseph Byrne

(57) ABSTRACT

A welding apparatus for submerged arc welding is disclosed. The welding apparatus includes a welding power supply and a wire feeder in electrical communication with the power supply. A torch is in electrical communication with the power supply and is adapted to deliver an electrode wire from the wire feeder to an arc. A flux system having a flow path for delivering flux to the arc includes a pinch valve disposed to open and close the flow path.

25 Claims, 6 Drawing Sheets

METHOD AND APPARATUS FOR SUBMERGED ARC WELDING

FIELD OF THE INVENTION

The present invention relates generally to an apparatus and method for performing submerged arc welding. More specifically, it relates to an apparatus and method for delivering welding flux using a pinch valve to control the flow of flux to the arc.

BACKGROUND OF THE INVENTION

Submerged arc welding is a type of welding where the arc is completely submerged in a covering of granular fusible flux. The flux protects the molten weld puddle from atmospheric contamination. Submerged arc welding systems, like other types of welding systems, typically include a welding power supply, a wire feed control and drive assembly and a welding torch. In addition, submerged arc welding systems also include a flux system. The flux system holds and delivers the flux to the weld joint during welding. Flux systems typically are either gravity fed or pressurized (forced air) systems.

Flux systems typically include a hopper having a chamber for holding the flux, a feeding device (typically a tube connected to the torch) for delivering the flux from the hopper to the arc, and a flux valve to start and stop the flow of flux from the hopper to the arc. Some flux systems also include a recovery system for recovering any unfused flux from the workpiece being welded.

There are basically two types of welding torch/flux feeding device combinations used in submerged arc welding—side flux delivery systems and concentric flux delivery systems. Flux is delivered in front of the wire electrode in side flux delivery systems. In concentric flux delivery systems, flux is delivered concentrically around the wire electrode.

Submerged arc welding systems can be fully automatic or semi-automatic (also called manual). The entire welding process is automatically controlled in a fully automatic system. The welding torch can be automatically moved over a stationary workpiece or the workpiece can be moved automatically under a stationary welding torch. In a semi-automatic system, an operator adjusts the welding parameters during welding and manually moves the torch.

A typical submerged arc welding pass includes the following steps. The first step is called pre-flux. The flux valve is opened and flux flows from the hopper to the weld joint during pre-flux. The arc, however, is not started and the torch is not moving during pre-flux. The flux continues to flow and pile up under the torch until the pile of flux located on the weld joint backs up into the torch (and feeding device). At that point, the flux in the flux valve and feeding device is substantially stationary and no more flux flows from the hopper even though the flux valve is open.

Following pre-flux, the arc is started and welding begins. The torch and accompanying arc move along the weld joint. Flux flows through the flux valve and feeding device to the torch as the torch moves forward. Movement of the torch is stopped at the end of the weld joint. The flux continues to flow until it once again piles up under the torch and backs up into the torch. The flux valve is closed after the flux has substantially stopped flowing. Finally, the arc is stopped and the welding pass is complete.

The flux valve is typically located in-line between the hopper and the arc. The valve opens and closes to release flux from the hopper chamber to the arc. Prior art flux valves used in automatic submerged arc welding systems suffer from many problems. These valves typically are complex devices having many parts. All of the prior art flux valves, in addition, have moving valve parts that come in contact with the flux itself. The granular flux passing through these valves can clog the moving parts or cause these parts to wear out prematurely.

A common type of prior art flux valve in use is the guillotine valve. In a guillotine valve, a thin blade slides on a track in and out of the flux flow path. The guillotine valve is well suited for this application because the blade's thin edge easily knifes through the stationary flux that backs up into the flux valve and feeding device after the torch stops moving. The guillotine valve suffers from several problems however. Many of the moving parts of this valve are in continuous contact with the granular flux. This results in excessive wear and tear on those parts and the valve itself.

Flux also gets on to the blade's track as the blade moves back and forth. This flux can interfere with movement of the blade, eventually resulting in failure of the valve. Additionally, a portion of the flux that collects on the track is continuously pushed off of the track and expelled from the flux system by the moving blade. An extra recovery system is required to collect this expelled flux.

What is desired, therefore, is a valve structure that is simple with few parts. It is also desirable to have a valve that is sealed so that no flux can escape from the flux system. It is further desirable to have a flux valve with no moving parts in contact with the granular flux material. Finally it is desirable to have a valve that can open and close easily when the granular flux passing through the valve is stationary (or substantially stationary).

SUMMARY OF THE PRESENT INVENTION

According to a first aspect of the invention, a welding apparatus for submerged arc welding includes a welding power supply, a wire feeder in electrical communication with the power supply, a torch in electrical communication with the power supply, and a flux system. The torch is adapted to deliver an electrode wire from the wire feeder to an arc. The flux system has a flow path for delivering flux to the arc and includes a pinch valve disposed to open and close the flow path.

In one embodiment, the pinch valve includes an elastomeric tube defining a portion of the flow path and in another embodiment the elastomeric tube is made of latex.

In other embodiments, the pinch valve includes an elastomeric tube made of latex defining a portion of the flow path and a pneumatic actuator disposed to open or close the flow path. In alternative embodiments an electrical actuator is disposed to open or close the flow path.

According to a second aspect of the invention, a flux system for supplying flux to a welding arc along a flow path includes a hopper having a discharge port, a feeding device, and a pinch valve. The feeding device is connected to the discharge port and defines a portion of the flow path. The pinch valve is in the flow path and opens and closes the flow path.

In one embodiment, the pinch valve includes an elastomeric tube defining a portion of the flow path and in another embodiment the elastomeric tube is made of latex.

In other embodiments, the pinch valve includes an elastomeric tube made of latex defining a portion of the flow path and a pneumatic actuator disposed to open or close the flow path. In alternative embodiments an electrical actuator is disposed to open or close the flow path.

According to a third aspect of the invention, a method of submerged arc welding includes actuating a pinch valve to open a flux flow path, delivering flux along the flux flow path to submerge an arc, supplying weld power to the arc, and feeding an electrode wire through a torch to the arc.

In one embodiment, the pinch valve is pneumatically actuated to open the flux flow path.

In a second embodiment, the method includes moving the torch along a weld joint and actuating the pinch valve to close the flow path after the torch stops moving along the weld joint. In a third embodiment, the method includes moving the torch along a weld joint and actuating the pinch valve to close the flow path when the flux in the flow path is substantially stationary.

Figure 1:
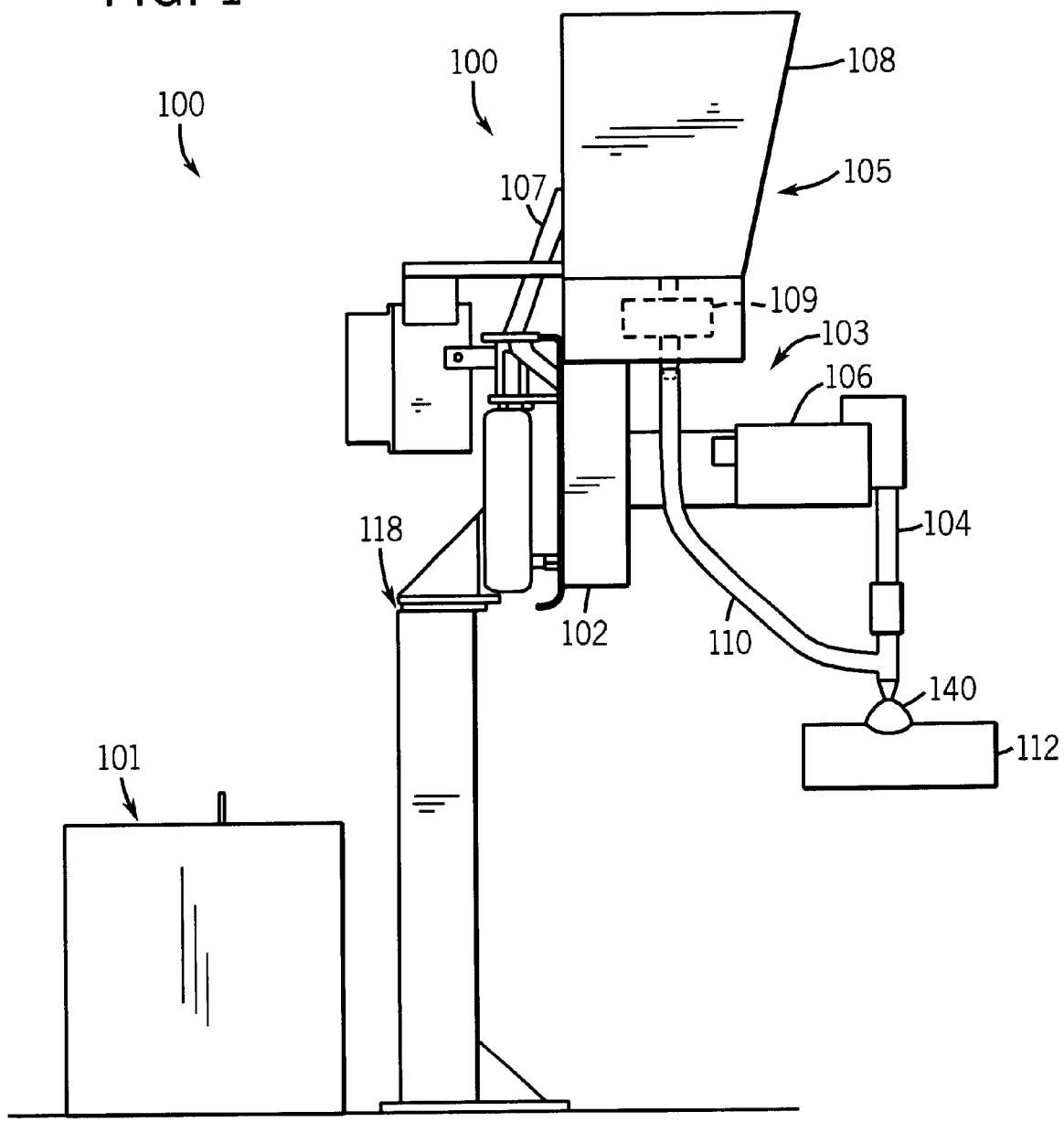
FIG. 1 shows a side view of a submerged arc welding system in accordance with one embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular submerged arc welding system configuration and a particular pinch valve configuration, it should be understood at the outset that the present invention is not limited to these particular configurations and each may include the addition of components, the deletion of components, or the substitution of components.

Generally, the present invention involves a method and apparatus for performing submerged arc welding. The system includes a welding power supply for supplying welding power, a wire feed control and drive assembly for delivering an electrode wire to the arc and a welding torch for producing the arc. The system also includes a flux system having a hopper for holding the flux and a pinch valve for starting and stopping the flow of flux from the hopper to the arc. Pinch valve as used herein includes any valve wherein the flow path through the valve is defined by the inside surface (s) of a tubular structure and the flow path is closed by applying pressure (e.g. pinching) to the outside surface(s) of the tubular structure and is opened by removing the pressure from the outside surface(s) of the tubular structure.

The pinch valve includes an elastomeric tube extending from the hopper chamber to a feeding device that is adapted to deliver the flux to the arc in the preferred embodiment. The elastomeric tube is pinched shut (the valve is closed) by way of a spring activated pinch bar pressing against a backing plate. To open the valve, an actuator is used to counteract the force of the springs. The actuator pulls the pinch bar away from the backing plate thereby opening the valve and allowing flux to flow to the arc.

In the preferred embodiment of the present invention, mechanical springs are used as actuators to close the pinch valve and an electrical solenoid is used as an actuator to open the pinch valve. In alternative embodiments, a pneumatic actuator or a hydraulic actuator is used to counteract the force of the springs to open the pinch valve. In other embodiments a double acting electrical actuator, pneumatic actuator or hydraulic actuator is used to both open and close the pinch valve.

Figure 2:
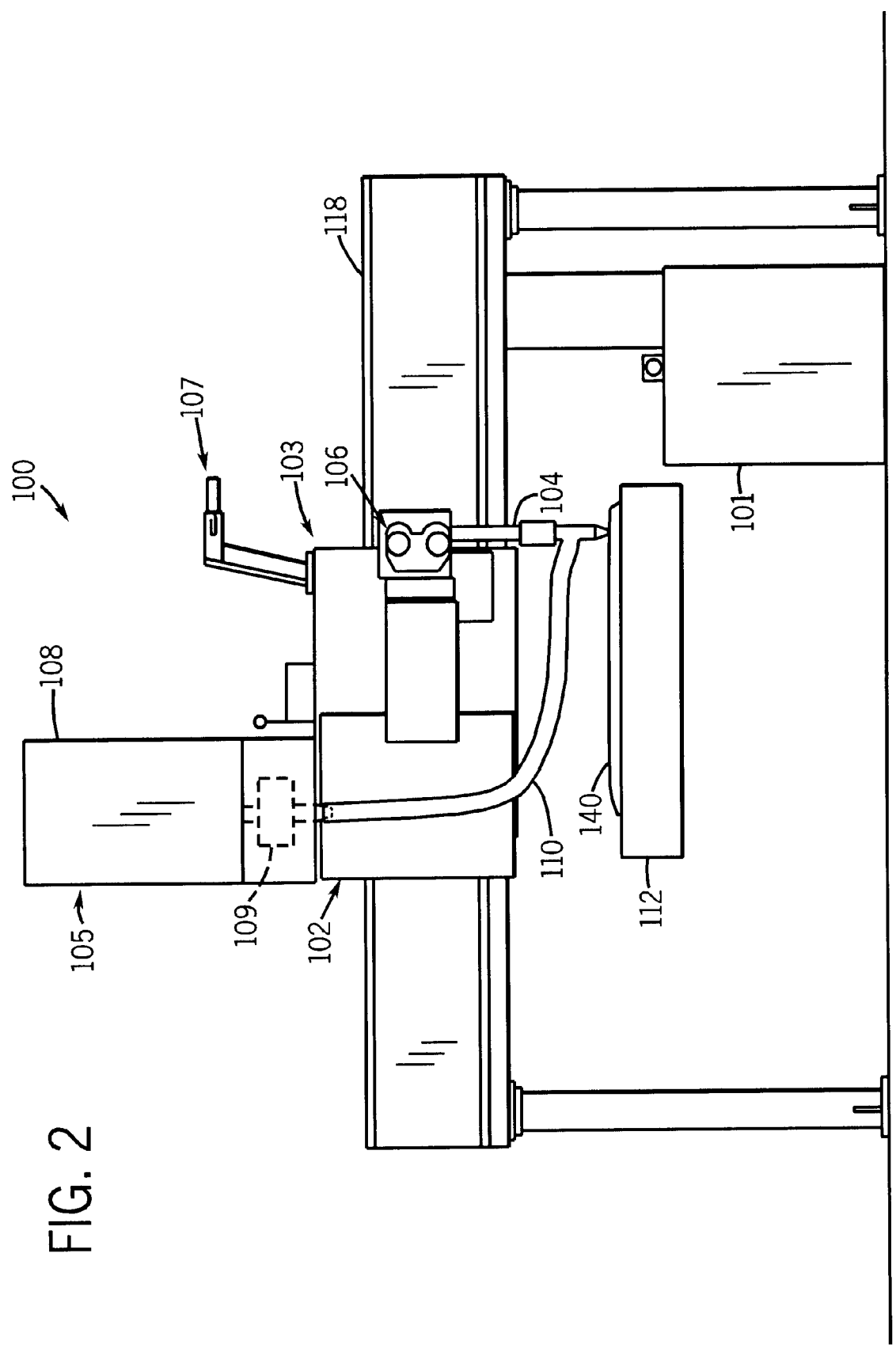
FIG. 2 shows a front view of the submerged arc welding system shown in FIG. 1.

FIGS. 1 and 2 show an automatic submerged arc welding system 100 according to the preferred embodiment of the present invention. Although the preferred embodiment of the present invention is shown as an automatic system, the present invention can also be implemented as a semi-automatic (manual) submerged arc welding system.

System 100 includes a welding power supply 101, a controller 102, a wire drive assembly 103, a welding torch 104 and a flux system 105. Wire drive assembly 103 includes a drive motor 106 and a spool support 107. Flux system 105 includes a hopper 108, a pinch valve 109 and a feeding device 110.

Controller 102 is a separate unit in the preferred embodiment and controls, among other things, electrode wire feed speed. In an alternative embodiment, the wire drive assembly and the controller for controlling wire feed speed are integrated into a single unit. The term wire feeder, as used herein, means any device or combination of devices that feed an electrode wire to the arc and control wire feed speed.

Figure 3:
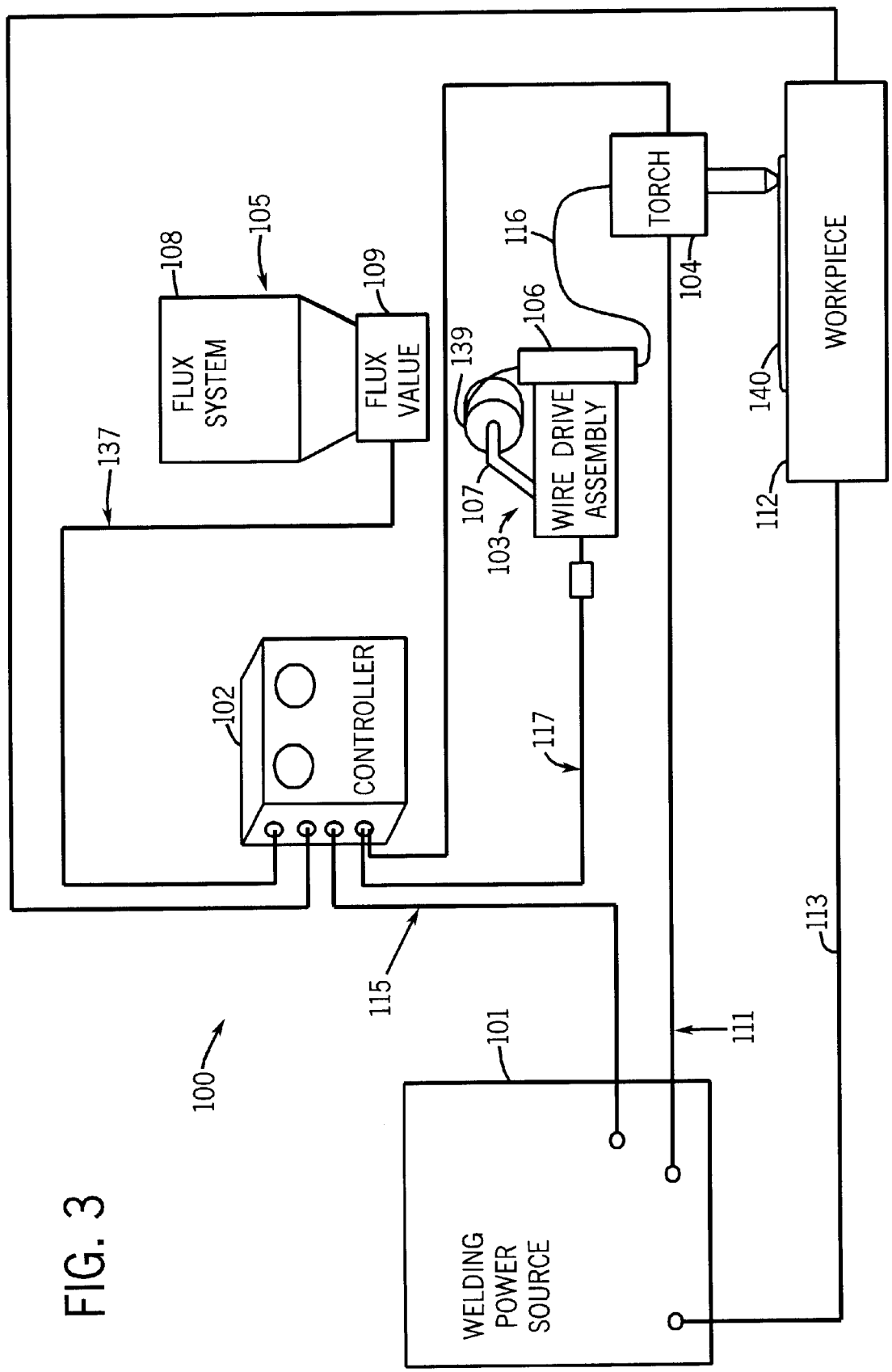
FIG. 3 shows a block diagram of the submerged arc welding system shown in FIGS. 1 and 2.

A block diagram showing the connections between the various components of system 100 is shown in FIG. 3. One output terminal of welding power supply 101 is connected to welding torch 104 via a weld cable 111. The other terminal of welding power supply 101 is connected to a workpiece 112 via a second weld cable 113. Controller 102 controls the output of welding power supply 101 via cable 115.

An electrode wire 116 is fed to welding torch 104 by wire drive assembly 103 from a wire spool 139 mounted on spool support 107. Controller 102 controls the electrode wire feed speed via cable 117. Flux 140 is delivered from hopper 108 to the arc via feeding device 110 (see FIGS. 1 and 2) during welding operations. The flow of flux from hopper 108 is controlled by pinch valve 109 which is in turn controlled by controller 102 via cable 137.

Submerged arc welding system 100 is shown mounted on a side beam 118 in the preferred embodiment (see FIGS. 1 and 2). System 100 is actually mounted to a carriage assembly (not shown) that travels along side beam 118 in the preferred embodiment. A motion controller in the carriage assembly is controlled by controller 102. Other mounting schemes are used in alternative embodiments of the present invention.

Figure 4:
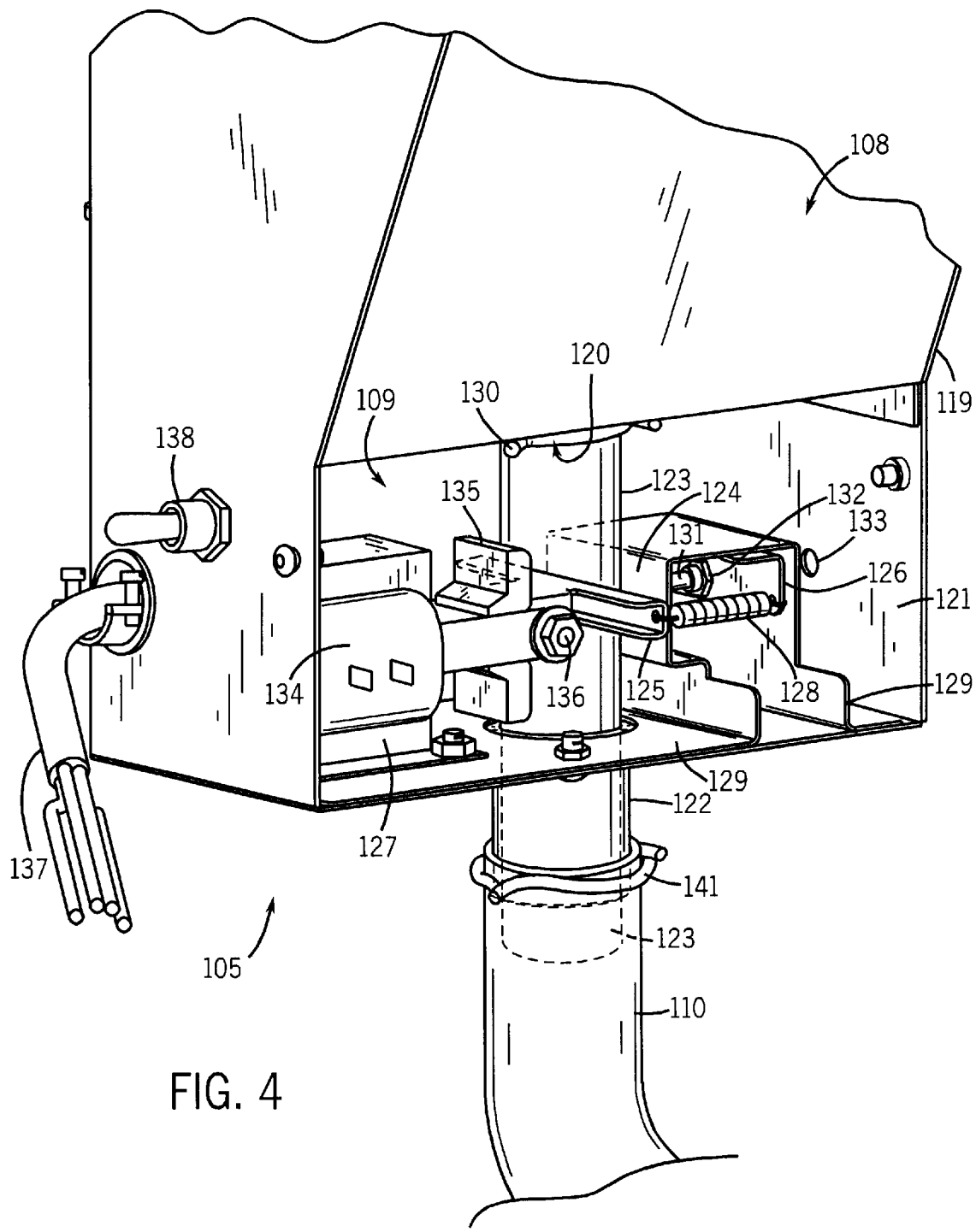
FIG. 4 shows a left side perspective view of a flux system in accordance with one embodiment of the present invention.
Figure 5:
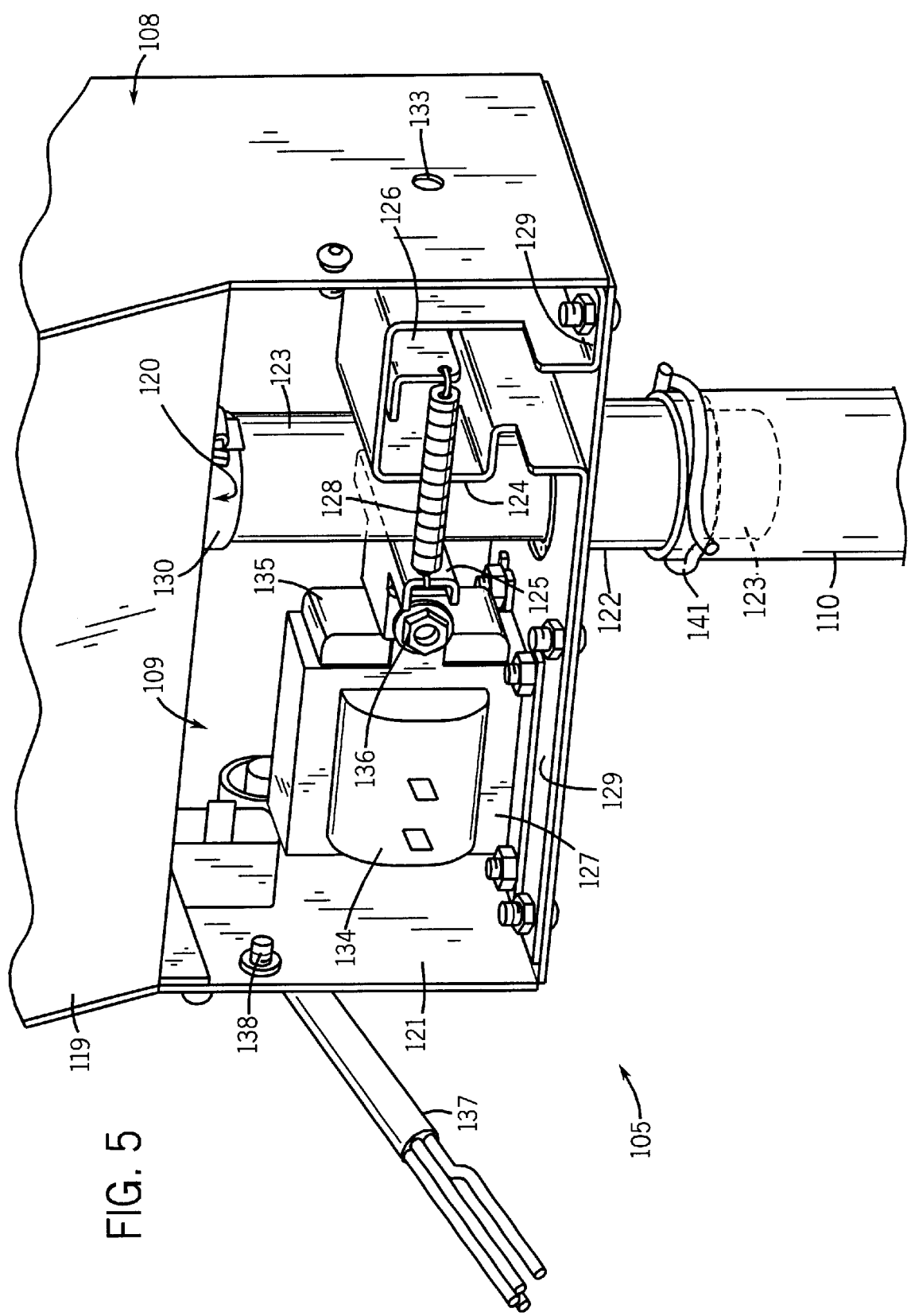
FIG. 5 shows a shows a right side perspective view of the flux system shown in FIG. 4.

FIGS. 4 and 5 show a close-up view of flux system 105 according to the preferred embodiment of the present invention. Flux system 105 includes hopper 108, pinch valve 109, and feeding device 110. Hopper 108 includes a flux chamber 119, a chamber outlet port 120, a valve compartment 121, and a hopper discharge port 122.

The flux flow path is as follows in the preferred embodiment. Flux exits chamber 119 through chamber outlet port 120 which extends downward from the bottom of chamber 119 into valve compartment 121. The flux next passes through pinch valve 109 located in valve compartment 121. The flux then exits hopper 108 through hopper discharge port 122 and flows into feeding device 110.

Feeding device 110 is a flexible tube in the preferred embodiment. One end of feeding device 110 is attached to discharge port 122 using a spring clamp 141. The other end of feeding device 110 is connected to torch 104. Flux is delivered from feeding device 110 to the arc through torch 104 in this embodiment (see FIGS. 1 and 2). In an alternative embodiment, flux is delivered to the weld joint through a tube just in front of the moving torch. Feeding device as used herein includes any device or apparatus that delivers flux from the hopper to the weld joint including both concentric and side feeding systems.

Pinch valve 109 is located at the hopper in the preferred embodiment. In alternative embodiments, pinch valve 109 is located anywhere in-line with the flux flow path including at the torch or in-line in the feeding device.

Pinch valve 109 includes an elastomeric tube 123, a backing plate 124, a movable pinch bar 125, a tension adjustment plate 126, an actuator 127, a pair of tension springs 128 (only one of which is shown) and a mounting plate 129. One end of elastomeric tube 123 is attached to chamber outlet port 120 using a spring clamp 130. The other end of elastomeric tube 123 extends downward through mounting plate 129 and into discharge port 122.

Elastomeric tube 123 in the preferred embodiment is made of latex. The present invention is not limited to latex tubes and many other types of elastomeric tubes will work. Elastomeric tube as used herein includes any tubular structure of any cross-sectional shape (e.g. circular, square, oval, etc..) capable of substantially recovering its cross-sectional shape after being deformed or pinched.

Backing plate 124 is located on one side of elastomeric tube 123 in the preferred embodiment. Movable pinch bar 125 is located on the other side of elastomeric tube 123. One end of each tension spring 128 is attached to movable pinch bar 125. The other end of each tension spring 128 is attached to tension adjustment plate 126. Tension adjustment plate 126 is attached to mounting plate 129 using tension adjustment bolt 131 and nut 132.

Generally, during non-use, pinch valve 109 is closed. Movable pinch bar 125 is pulled toward backing plate 124 by the force of springs 128. This pinches elastomeric tube 123 between pinch bar 125 and backing plate 124. It should be noted that the present invention is not limited to the use of pinch bars. Any structure capable of pinching an elastomeric tube can be used. For instance, a cam is used to pinch elastomeric tube 123 in an alternative embodiment. As the cam rotates fully, its surface rotates against the outer surface of elastomeric tube 123 thereby pinching the tube against a backing plate and closing the valve.

Tension adjustment plate 126 is held up against nut 132 by the force of tension springs 128. The amount of force applied to pinch bar 125 is increased by turning tension adjustment bolt 131 clockwise. This causes tension adjustment plate 126 to move away from pinch bar 125. Likewise, the force applied by tension springs 128 on pinch bar 125 can be decreased by turning tension adjustment bolt 131 counter-clockwise. This causes tension adjustment plate 126 to move toward pinch bar 125. An access hole 133 is provided in the side of valve compartment 121 to allow for easy access to tension adjustment bolt 131.

Pinch bar 125 is also attached to actuator 127 in the preferred embodiment. Actuator 127 is an electrical solenoid having a coil 134 and a plunger 135. Plunger 135 is connected to pinch bar 125 via bolt 136. Plunger 135 is pulled into coil 134 when voltage is supplied to solenoid 127 from controller 102. The force exerted on plunger 135 by coil 134 is sufficient to overcome the force of springs 128 and pinch bar 125 is pulled away from backing plate 124. The end result is that elastomeric tube 123 opens and flux flows from hopper 108 to the arc.

In the preferred embodiment, solenoid 127 is a laminated solenoid rated at 120 volts ac and 60 Hz. The 115 volt ac signal used to activate solenoid 127 is automatically supplied by controller 102 via cable 137 during welding operations. Flux system 105 in the preferred embodiment also includes a toggle switch 138 connected between controller 102 and solenoid 127. Toggle switch 138 allows for manual operation of pinch valve 109.

To close pinch valve 109, the voltage to solenoid 127 is cut-off by controller 102. Once the voltage is cut-off, the force acting on plunger 135 is removed. With no counteracting force available to overcome the force of springs 128, pinch bar 125 is once again pulled toward backing plate 124 pinching elastomeric tube 123 shut thereby closing the valve.

Pinch valve 109 closes after torch 104 has stopped traveling in one embodiment of the present invention. In this embodiment, the flux in pinch valve 109 is substantially stationary when pinch valve 109 closes. As used herein, the flux flowing in a pinch valve is substantially stationary when it is either stationary or when it is backing up into the pinch valve from the welding joint (e.g. arc). In alternative embodiments of the present invention, pinch valve 109 closes before torch 104 stops traveling or while flux is flowing through pinch valve 109.

Pinch valve 109 in the preferred embodiment includes a mechanical actuator (springs 128) to close the valve and an electrical actuator (solenoid 127) to open the valve. In alternative embodiments, the same actuator is used to both open and close the pinch valve. For instance a double acting actuator can be used.

The present invention is also not limited to these types of actuators. Other types of actuators, including pneumatic actuators or hydraulic actuators or other types of mechanical or electrical actuators can be used. Electrical actuator means any device that uses electric or magnetic signals to open and close the pinch valve (e.g. using an electrical solenoid to move a pinch bar or a cam). Pneumatic actuator means a device that uses pressurized gas to open and close the pinch valve and includes applying pressurized gas directly to the outside surface of the tube, inflating a bladder to pinch the tube shut, or using pressurized gas to control movement of a mechanical device or structure to open and close the valve (e.g. using a pneumatic cylinder to move a pinch bar). Hydraulic actuator as used herein means a device that uses pressurized liquid to open and close the pinch valve.

Figure 6:
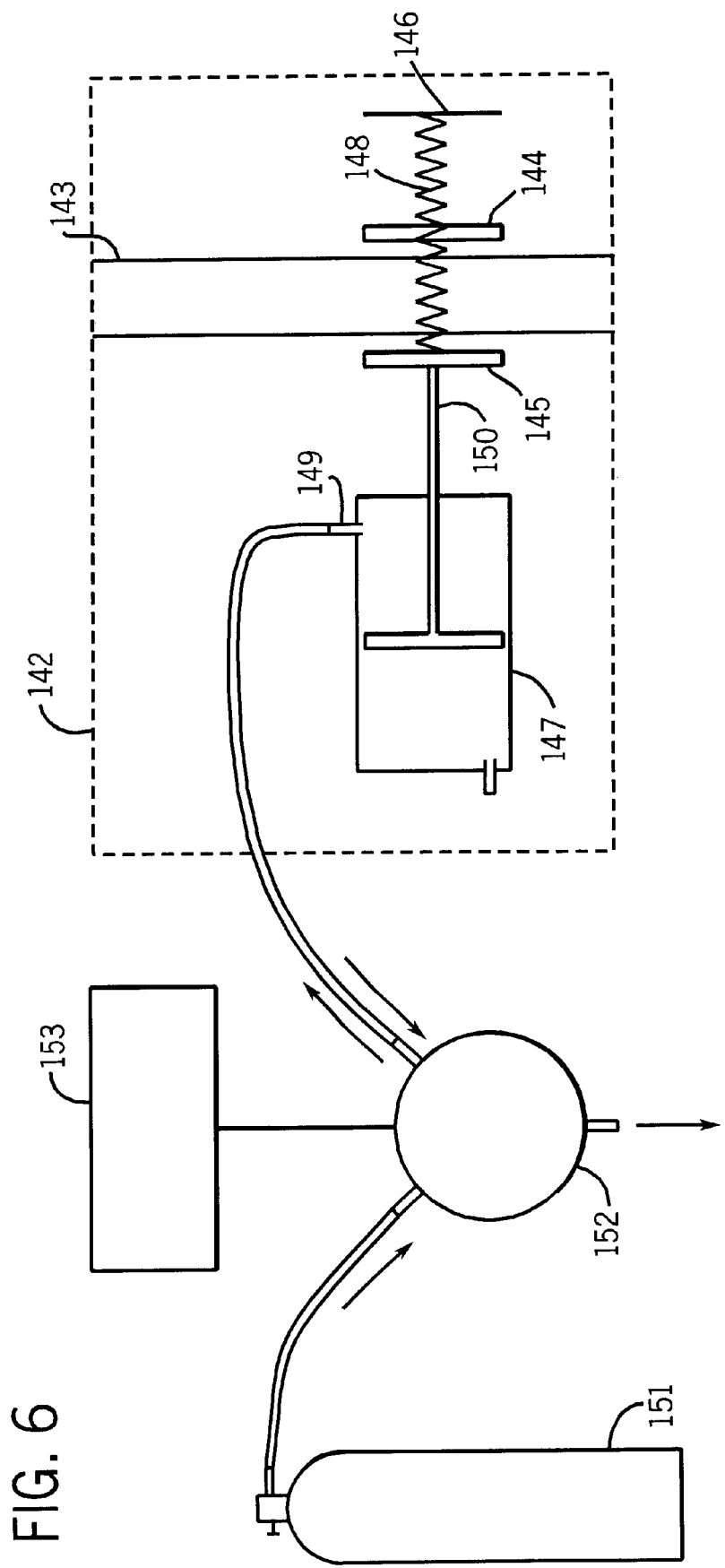
FIG. 6 shows a block diagram of a flux system according to an alternative embodiment of the present invention.

FIG. 6 shows a block diagram of an alternative embodiment of the present invention using a pneumatic actuator. Pinch valve 142 in this embodiment is similar to pinch valve 109 and includes an elastomeric tube 143, a backing plate 144, a movable pinch bar 145, a tension adjustment plate 146, a pneumatic actuator 147, and a pair of tension springs 148 (only one of which is shown).

The general connection and operation of the various components of pinch valve 142 is similar to pinch valve 109 with the one exception that pneumatic actuator 147 replaces electrical solenoid 127. Normally, during non-use, pinch valve 142 is closed by the force of springs 148 acting on pinch bar 145. Pinch valve 142 is opened by actuator 147. Actuator 147 is a single action air cylinder in this embodiment having an air inlet port 149 and a piston rod 150. Piston rod 150 is connected to movable pinch bar 145.

Piston rod 150 is pulled into air cylinder 147 when air is supplied to air inlet port 149. The resulting force exerted by piston rod 150 on movable pinch bar 145 is sufficient to overcome the force of springs 148 and pinch valve 142 opens. Pinch valve 142 is closed by allowing the air inside of air cylinder 147 to bleed off through air inlet port 149.

Compressed air is supplied to air cylinder 147 from a compressed air source 151 through an air valve 152. Air valve 152 is controlled by controller 153. Controller 153 is similar to controller 102 in the preferred embodiment. Controller 153 switches air valve 152 between two positions. The first position allows air to flow from compressed air source 151 to air cylinder 147. The second position allows air to bleed off from air cylinder 147.

Numerous modifications may be made to the present invention which still fall within the intended scope hereof. Thus, it should be apparent that there has been provided in accordance with the present invention a method and apparatus for performing submerged arc welding using a pinch valve to start and stop the flow of flux in the system. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding apparatus for submerged arc welding comprising:
    a welding power supply;
    a wire feeder in electrical communication with the power supply;
    a torch in electrical communication with the power supply and adapted to deliver an electrode wire from the wire feeder to an arc;
    a flux system having a flow path for delivering flux to the arc including a pinch valve, wherein the pinch valve is disposed to open and close the flow path.

2. The welding apparatus of claim 1 wherein the pinch valve includes an elastomeric tube defining a portion of the flow path.

3. The welding apparatus of claim 2 wherein the elastomeric tube is made of latex.

4. The welding apparatus of claim 3 wherein the pinch valve includes a pneumatic actuator disposed to open the flow path.

5. The welding apparatus of claim 3 wherein the pinch valve includes a pneumatic actuator disposed to close the flow path.

6. The welding apparatus of claim 3 wherein the pinch valve includes an electrical actuator disposed to open the flow path.

7. The welding apparatus of claim 3 wherein the pinch valve includes an electrical actuator disposed to close the flow path.

8. The welding apparatus of claim 1 wherein the torch travels along a weld joint and further wherein the pinch valve includes an actuator disposed to close the flow path after the torch stops traveling along the weld joint.

9. The welding apparatus of claim 1 wherein the pinch valve includes an actuator disposed to close the flow path when the flux in the flow path is substantially stationary.

10. A flux system for supplying flux to a welding arc along a flow path comprising:
    a hopper having a discharge port;
    a feeding device connected to the discharge port and defining a portion of the flow path;
    a pinch valve in the flow path, wherein the pinch valve opens and closes the flow path.

11. The system of claim 10 wherein the pinch valve includes an elastomeric tube defining a portion of the flow path.

12. The system of claim 11 wherein the elastomeric tube is made of latex.

13. The system of claim 12 wherein the pinch valve includes a pneumatic actuator disposed to open the flow path.

14. The system of claim 12 wherein the pinch valve includes a pneumatic actuator disposed to close the flow path.

15. The system of claim 12 wherein the pinch valve includes an electrical actuator disposed to open the flow path.

16. The system of claim 12 wherein the pinch valve includes an electrical actuator disposed to close the flow path.

17. A method of submerged arc welding comprising:
    actuating a pinch valve to open a flux flow path;
    delivering flux along the flux flow path to submerge an arc;
    supplying weld power to the arc; and
    feeding an electrode wire through a torch to the arc.

18. The method of claim 17 wherein the pinch valve is pneumatically actuated to open the flux flow path.

19. The method of claim 17 including moving the torch along a weld joint and further including actuating the pinch valve to close the flow path after the torch stops moving along the weld joint.

20. The method of claim 17 including moving the torch along a weld joint and further including actuating the pinch valve to close the flow path when the flux in the flow path is substantially stationary.

21. The welding apparatus of claim 1 wherein the pinch valve is configured to close the flow path when the flux in the pinch valve is substantially stationary.

22. The flux system of claim 10 wherein the pinch valve is configured to close the flow path when the flux in the pinch valve is substantially stationary.

23. The method of claim 17 further including actuating the pinch valve to close the flux flow path when the flux in the pinch valve is substantially stationary.

24. A method of delivering flux to a welding joint under a welding torch comprising:
    delivering the flux along a flux flow path through a pinch valve to the welding joint;
    piling up the flux on the welding joint until the flow of flux through the pinch valve is substantially stationary; and
    actuating the pinch valve to close the flux flow path when the flow of flux through the pinch valve is substantially stationary.

25. A method of submerged arc welding comprising:
first, actuating a pinch valve to open a flux flow path;
next, delivering flux along the flux flow path through the pinch valve to a welding joint;
next, starting an arc;
next, moving a torch along the welding joint;
next, stopping the torch;
next, piling up the flux under the torch until the flow of flux through the pinch valve is substantially stationary;
next, actuating the pinch valve to close the flux flow path when the flow of flux through the pinch valve is substantially stationary; and
next, stopping the arc.

* * * * *